United States Patent [19]
Sakoda et al.

[11] Patent Number: 6,088,345
[45] Date of Patent: Jul. 11, 2000

[54] COMMUNICATION METHOD, BASE STATION AND TERMINAL APPARATUS

[75] Inventors: Kazuyuki Sakoda; Takashi Usui, both of Tokyo; Mitsuhiro Suzuki, Chiba; Jun Iwasaki, Tokyo; Shiro Omori, Kanagawa; Tetsuya Naruse, Chiba; Tomoya Yamaura, Tokyo, all of Japan

[73] Assignee: Sony Corporation, Tokyo, Japan

[21] Appl. No.: 08/974,626

[22] Filed: Nov. 19, 1997

[30] Foreign Application Priority Data

Nov. 22, 1996 [JP] Japan .................................. 8-312296

[51] Int. Cl.⁷ .................................................. H04B 7/216

[52] U.S. Cl. ........................ 370/335; 370/336; 370/342; 370/345

[58] Field of Search ..................................... 370/310, 315, 370/316, 319, 321, 328, 329, 335, 336, 337, 345, 347, 348, 477, 479, 498, 342

[56] References Cited

U.S. PATENT DOCUMENTS

| | | | |
|---|---|---|---|
| 5,515,379 | 5/1996 | Crisler et al. | 370/347 |
| 5,521,925 | 5/1996 | Merakos et al. | 370/337 |
| 5,541,552 | 7/1996 | Suzuki et al. | . |
| 5,594,738 | 1/1997 | Crisler et al. | 370/347 |
| 5,694,415 | 12/1997 | Suzuki et al. | . |
| 5,742,592 | 4/1998 | Scholefield et al. | 370/329 |

*Primary Examiner*—Ajit Patel
*Assistant Examiner*—Bob A. Phunkulh
*Attorney, Agent, or Firm*—Jay H. Maioli

[57] ABSTRACT

In a radio communication such as a radio telephone system or the like, a transmission channel which can accommodate a change in a transmission capacity is set. While a terminal apparatus and a base station are in communication for transmitting a predetermined information using a predetermined transmission channel, a signal requesting to set another transmission channel is transmitted using a part of the predetermined transmission channel to initiate communication between the terminal apparatus and the base station through the other transmission channel.

18 Claims, 6 Drawing Sheets

FIG. 5A One Slot Used

FIG. 5B Two Slots Used

FIG. 5C Three Slots Used

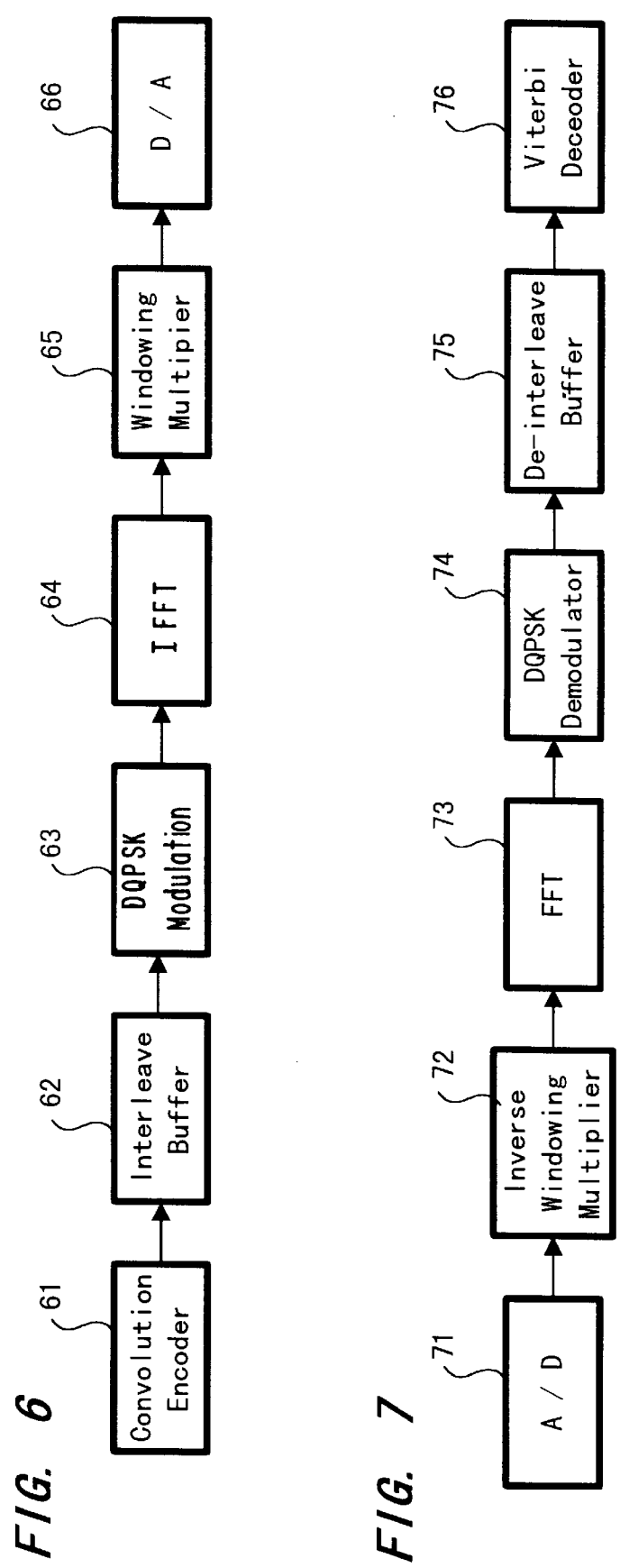

COMMUNICATION METHOD, BASE STATION AND TERMINAL APPARATUS

BACKGROUND OF THE INVENTION

1. Field of the Invention

The present invention relates to a method of communication suitable for use in, for example, a base station and a terminal apparatus in a radio telephone system, and to a base station and a terminal apparatus to which the method of communication is applied 2. Description of the Related Art In a mobile communication such as a radio telephone system or the like, multiple access is provided wherein a plurality of mobile stations (terminal apparatuses or subscribers) have access to a single base station. In this case, a predetermined transmission band is allocated in advance to each base station; a plurality of transmission channels are set in the transmission band; in the case of a request for communication or the like from each terminal apparatus, any of the transmission channels can be allocated to the terminal apparatus; and the terminal apparatus side initiates communication by way of the base station using the allocated transmission channel.

For example, such systems of communication wherein the transmission channels are set include a frequency division multiple access (FDMA), a time division multiple access (TDMA), a code division multiple access (CDMA) and so on.

Referring to each method, in an FDMA communication system a plurality of transmission channels are provided by dividing the transmission band by a unit of frequency. In a TDMA communication system a transmission channel is divided by a predetermined time unit to form a plurality of time slots within a single transmission channel, each of the time slots being allocated to the terminal equipments to be linked. Therefore, it is possible to link the plurality of terminal equipment using the single transmission channel. In a CDMA communication system of a specified code is allocated to each of the terminal equipments and a carrier having the same frequency is subjected to spectrum spread modulation by the code for transmitting it to the base station. The receiving side achieves synchronization with each code to identify a signal from a desired terminal apparatus.

In the following description, a communication line set between a single terminal apparatus and a base station is referred to as one transmission channel. Therefore, in the case of the TDMA system, a time slot allocated to a terminal apparatus is logically one transmission channel and, in the case of the CDMA system, the transmission of a signal spread into a code allocated to a terminal apparatus is logically one transmission channel.

Meanwhile, in a radio telephone system, a transmission capacity which can be transmitted through one transmission channel has been fixed regardless of the system used for setting the transmission channels in any system, and it has not been possible to change the transmission capacity depending on the type of the data to be transmitted. For example, to transmit image data for facsimile during an on-going audio call using a terminal apparatus which is a portable telephone, it has been necessary to transmit the image data instead of audio data with the audio call interrupted temporarily and it has not been possible to transmit the image data from the portable telephone concurrently with the transmission of the audio data.

Meanwhile, a capability of transmitting various data other than audio data utilizing a wireless terminal such as a portable telephone or the like has recently been coming into practice. However, when only one type of data of a fixed capacity can be transmitted through one transmission channel, it is necessary to interrupt the transmission of data of other types or to re-perform a process of connecting the line each time the type of data is transmitted. This has made a transmission process cumbersome and not preferred from the viewpoint of efficiency of use of a communication line.

SUMMARY OF THE INVENTION

In view of such aspects, it is an object of the invention to make it possible in a radio communication, such as a radio telephone system or the like, to set a transmission channel which can accommodate changes in transmission conditions such as a transmission capacity or the like.

According to a first aspect of the present invention, a communication resource allocation method for allocating communication resource by a second apparatus from a request from a first apparatus, includes a communication resource allocating step of, when in a normal state a signal generated by the first apparatus and transmitted to the second apparatus comprises a predetermined amount of information bits and in an allocation request state a part of the predetermined amount of information bits is regarded as an allocation request bit, allocating communication resource depending upon whether or not the second apparatus detects the allocation request bit.

According to a second aspect of the present invention, a base station for allocating a communication resource includes a receiving means for receiving signal from a subscriber, a control means for picking up a part of information bits of an output signal from the receiving means as an allocation request bit, and for allocating communication resource depending upon whether or not the allocation request bit is detected, and a transmitting means for transmitting the communication resource allocation result to the subscriber.

According to a third aspect of the present invention, a subscriber apparatus includes a control means for generating a communication resource allocation signal to a base station, and a transmitting means for transmitting an output signal from the control means to the base station. In a normal state, the transmitting means transmits a signal having a predetermined amount of information bits regarded as an allocation request bit and, in an allocation request state, the control means generates a signal in which a part of the predetermined quantity of information bits is regarded as an allocation request bit.

BRIEF DESCRIPTION OF THE DRAWINGS

FIGS. 5A to 5C are explanatory diagrams illustrating an example of the use of slots in the frame configuration in the example in FIG. 4;

FIG. 6 is a block diagram showing a modulation process in a case wherein an embodiment of the present invention is applied to a system of transmitting a multi-carrier signal;

FIG. 7 is a block diagram showing a demodulation process in a case wherein an embodiment of the present invention is applied to a method of transmitting a multi-carrier signal;

DESCRIPTION OF THE PREFERRED EMBODIMENTS

An embodiment of the present invention will now be described with reference to FIGS. 1 through 9.

Figure 1:
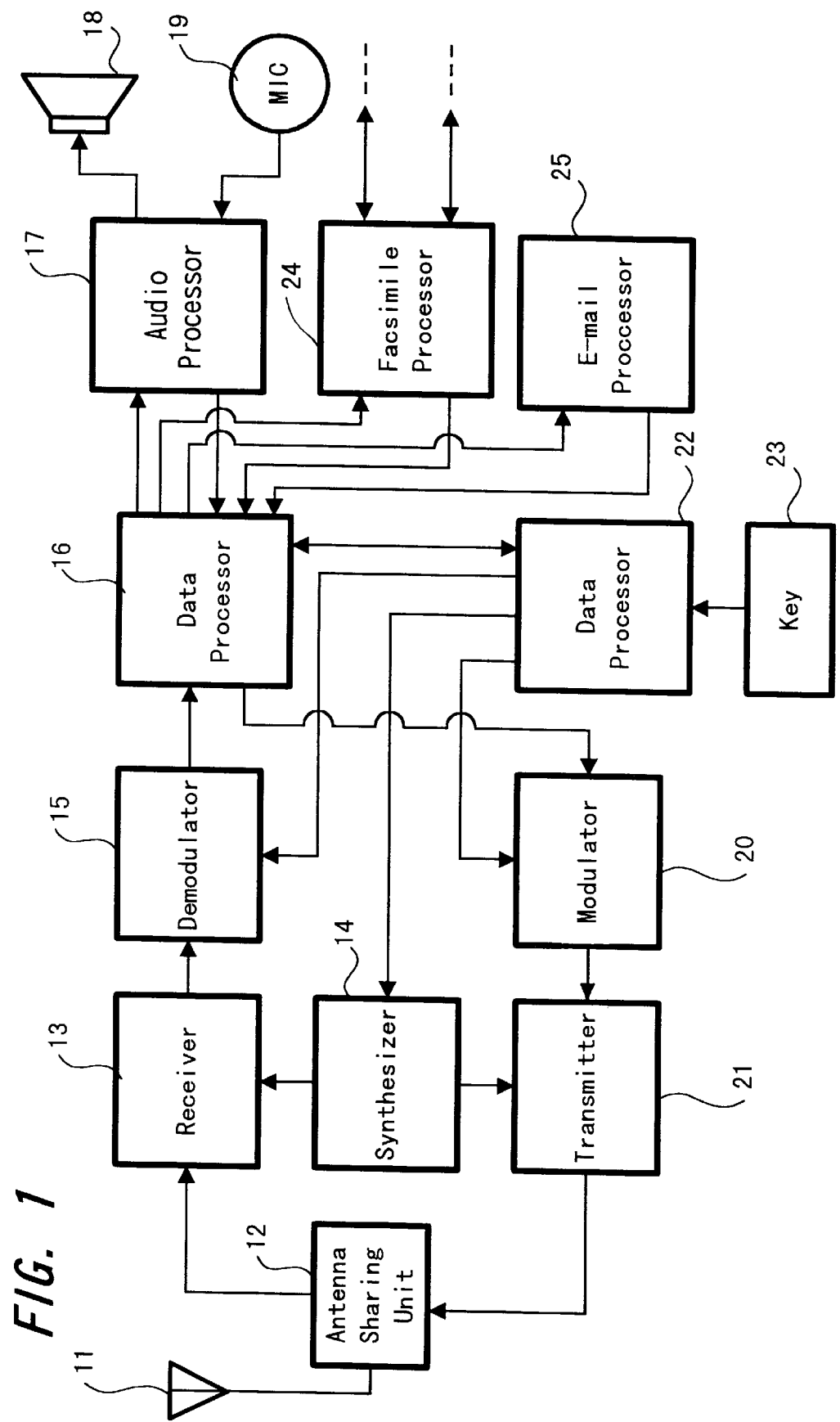
FIG. 1 is a block diagram showing a configuration of a terminal apparatus according to an embodiment of the present invention.

In the present embodiment, the present invention is applied to a cellular type radio telephone system wherein a communication area is set by locating base stations at a predetermined interval, and a configuration of a terminal apparatus used in the radio telephone system is first shown in FIG. 1. Referring first to the configuration of a reception system, an antenna 11 is connected to a reception unit 13 through an antenna sharing device 12, and an output frequency synthesizer, signal from a frequency synthesizer 14 constituted by a PLL circuit the like is supplied to the reception unit 13. The output frequency synthesizer signal from the frequency 14 is mixed with a reception signal supplied from the antenna 11 to the reception unit 13 to frequency convert on the reception signal at a predetermined frequency into an intermediate frequency signal. In this case, the output frequency of the frequency synthesizer 14 is determined based on the control of a control unit 22 which is a system controller for controlling the communication operation of this terminal apparatus.

The reception signal which has been converted into an intermediate frequency signal is supplied to a demodulation unit 15 where it is subjected to a demodulation process based on a specified communication system and thereby converted into reception data which is a symbol string. The reception data which is a demodulated symbol string is supplied to a data processing unit 16 which extracts required data and supplies the same to corresponding signal processing units.

For example, audio data included in the reception data is supplied to an audio processing unit 17, converted into an analog audio signal by an audio process in the audio processing unit 17, and emitted as sounds from a speaker 18 connected thereto. Facsimile data included in the reception data is supplied to a facsimile processing unit 24 and is converted by this facsimile processing unit 24 into data to be supplied to a facsimile apparatus (not shown). Further, electronic mail data included in the reception data is supplied to an electronic mail processing unit 25 and is converted by this electronic mail processing unit 25 into data to be supplied to an electronic mail receiving apparatus (such as a personal computer apparatus, personal digital assistant or the like which is not shown). Control data included in the reception data is supplied to the control unit 22 which executes the corresponding communication control. Those reception data types are determined from the control data or the like included in the reception data.

Referring next to a transmission system of the terminal apparatus, for example, in the case of audio data, an audio signal picked up by a microphone 19 connected to the audio processing unit 17 is converted by the audio processing unit 17 into digital audio data for transmission, and this audio data is supplied to the data processing unit 16 and is located at a predetermined position in a symbol string to be transmitted. At the other positions in the symbol string to be transmitted, a predetermined synchronization pattern, control data supplied from the control unit 22 and the like are located.

The transmission data which is a symbol string output from the data processing unit 16 is supplied to a modulation unit 20 to perform a modulation process for transmission, and the modulated signal is supplied to a transmission unit 21 where it is mixed with a frequency signal output by the frequency synthesizer 14 and thereby frequency-converted to a predetermined transmission frequency. A transmission signal at this transmission frequency is supplied through the antenna sharing device 12 to the antenna 11 to be transmitted on a wireless basis.

A facsimile signal transmitted from a facsimile apparatus (or a computer apparatus to which a modem for facsimile communication is connected) which is not shown, to the facsimile processing unit 24 is converted by the facsimile processing unit 24 into facsimile data, and the facsimile data is supplied to the data processing unit 16 where it is subjected to a transmission process similar to that in the case of audio data as described above. Further, electronic mail data for transmission supplied from an apparatus for transmitting and receiving an electronic mail, which is not shown, to the electronic mail processing unit 25 is converted by the electronic mail processing unit 25 into electronic mail data to be transmitted, and the electronic mail data is supplied to the data processing unit 16 where it is subjected to a transmission process similar to that in the case of audio data as described above.

Various keys 23 are connected to the control unit 22, and operations such as transmission and reception and so on are performed with the keys 23. Further, the terminal apparatus in the present embodiment has a capability of performing a communication process on a plurality of transmission channels simultaneously, and a transmission channel is set under the control of the control unit 22. The process of setting a plurality of transmission channels simultaneously will be described later. Further, referring to the facsimile processing unit 24 and the electronic mail processing unit 25, the operation of those processing units is stopped when the transmission of the corresponding data is not performed and, when a process of transmitting the corresponding data is to be performed, it is activated under the control of the control unit 22 to perform the process by executing a corresponding application program. Further, the facsimile processing unit 24 and the electronic mail processing unit 25 may be equipped with a storage means for storing received data and data to be transmitted. After, temporarily storing data received from the base station side, the facsimile processing unit 24 and the electronic processing unit 25 may transfer the data to the facsimile apparatus or the computer apparatus connected thereto when necessary, or transmit data transferred from the facsimile apparatus or computer apparatus and stored therein to the base station when necessary. Furthermore, the terminal apparatus itself may be equipped with a function corresponding to a facsimile apparatus or a computer apparatus.

Figure 2:
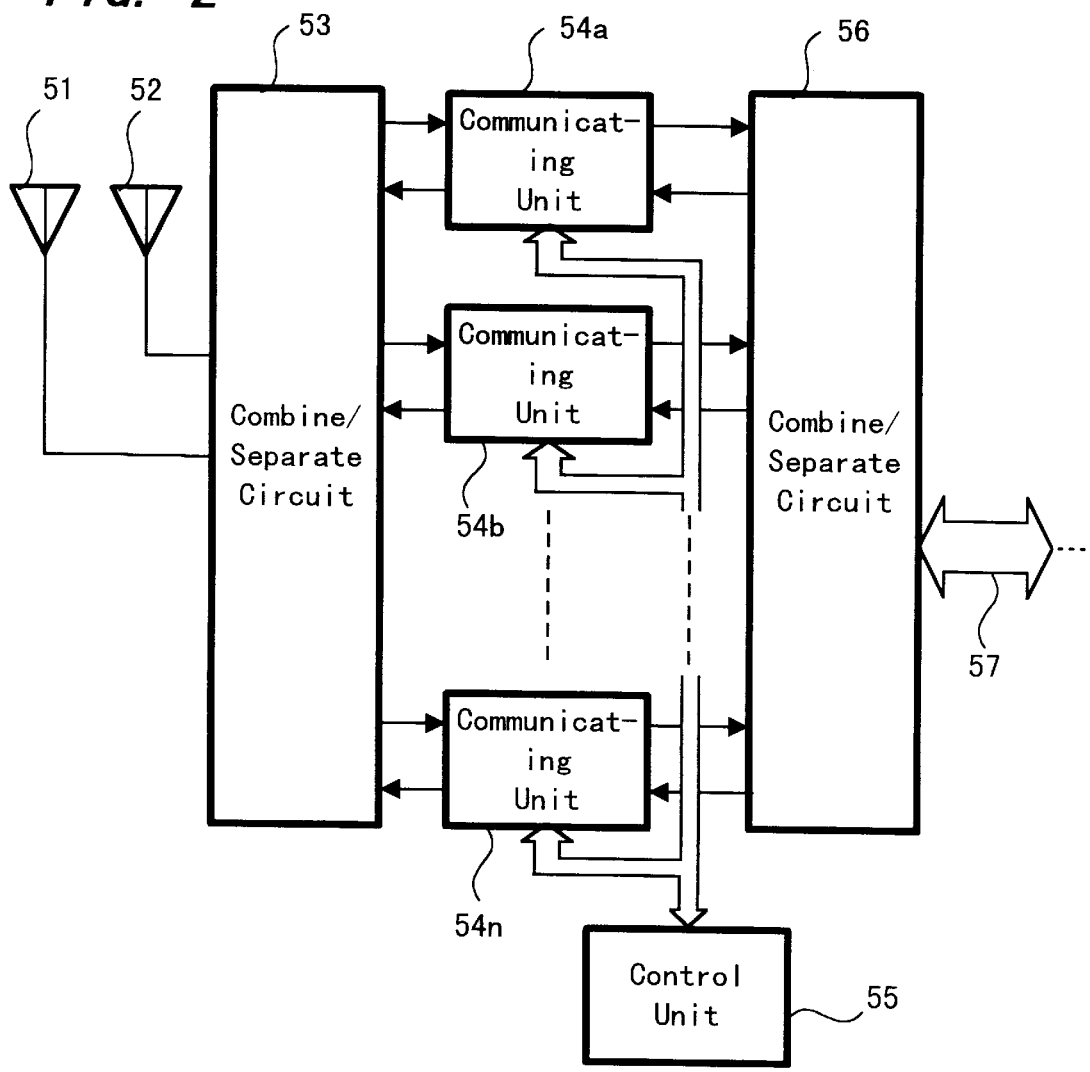
FIG. 2 is a block diagram showing a configuration of a base station according to an embodiment of the present invention.

A configuration of a base station which communicates with the terminal apparatus will now be described with reference to FIG. 2. Although the base station has a basic configuration for a communication process which is similar to that of the terminal apparatus an arrangement of the base station which communicates with a plurality of terminal apparatuses, is different from the terminal apparatus. Specifically, antenna systems 51, 52 for two systems are connected to a synthesis/separation circuit 53, and reception signals are separated by the synthesis/separation circuit 53 at every transmission channel or the like to separate reception signals from each terminal apparatus into signals of a plurality of systems for each of one or a plurality of terminal apparatuses. The reception signals in the respective separated systems are supplied to respective different communication units 54a, 54b, . . . , 54n (n is an arbitrary number) to be subjected to a reception process and a demodulation process. The demodulated reception data is subjected to a transmission process for transmitting it through an exclusive line 57 connected to a communication control station which coordinates base stations, and the processed signal is transmitted to the exclusive line 57 through a synthesis/separation circuit 56.

Further, a signal received through the exclusive line 57 by the base station is separated by the synthesis/separation circuit 56 into signals of a plurality of systems. The separated signals in respective systems are supplied to respective different communication units 54a, 54b, . . . , 54n, and a modulation process and a transmission process for transmission to the terminal apparatuses are performed after a process of receiving from the exclusive line 57 to supply the signals to either of the antennas 51, 52 through the synthesis/separation circuit 53 for transmission on a wireless basis.

The processes of transmission and reception at each of the communication units 54a–54n of the base station are performed under control of a control unit 55, and the addition and discrimination of necessary control data or the like are also carried out under control of the control unit 55.

Communication conditions for communication performed between the terminal apparatus and base station, which have been described above will now be described. In the embodiment, a transmission capacity for communication between the terminal apparatus and the base station can be adaptively set. The process of setting the transmission capacity adaptively will be described referring to a case wherein the TDMA system (time division multiple access system) is used as the system for communication between the terminal apparatus and base station. In the case of the TDMA-TDD (time division duplex) system, the transmission frequency and the reception frequency are the same; the transmission signal transmitted using the same frequency is a burst signal in a predetermined unit of time (e.g., on the order of several hundred μsec.); and the burst signal is intermittently transmitted and received between the terminal apparatus and base station.

Figure 4:
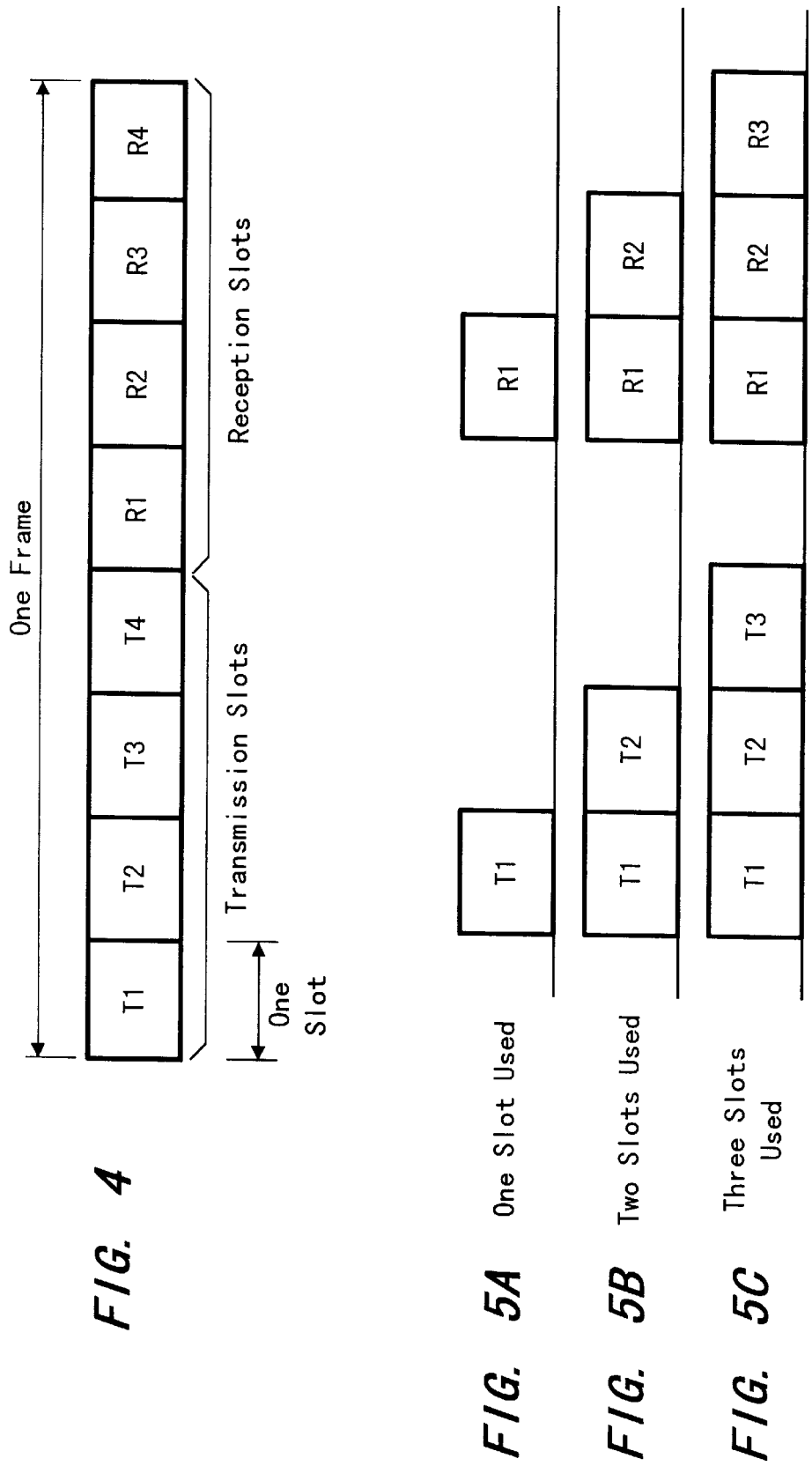
FIG. 4 is an explanatory diagram illustrating a configuration of a frame in a case wherein an embodiment of the present invention is applied to the TDMA system.

A burst signal of one unit is a signal for one slot period and, for example, one frame is defined by eight slot periods as shown in FIG. 4, and such one frame is repeated. When one frame is defined by eight slot periods, for example the first four slots of one frame are used as slots for transmission from the base station and the second four slots are used as slots for reception at the base station. Here, the first four slot periods that constitute a transmission slot period are given slots numbers T1, T2, T3, T4, and the second four slot periods that constitute a reception slot period are given slot numbers R1, R2, R3, R4.

During general communication according to the TDMA method, communication between a certain terminal apparatus and a base station is performed on a bi-directional basis using the slots No. T1, R1; communication between another terminal apparatus and the base station is performed on a bi-directional basis using the slots No. T2, R2; and communications with other terminal apparatuses are performed using the slots No. T3, R3 and slots No. T4, R4, respectively. Thus, communications with up to four terminal apparatuses can be simultaneously performed using one transmission frequency band. Some slots in one frame may be used as slots for transmitting control data.

Figure 3A:
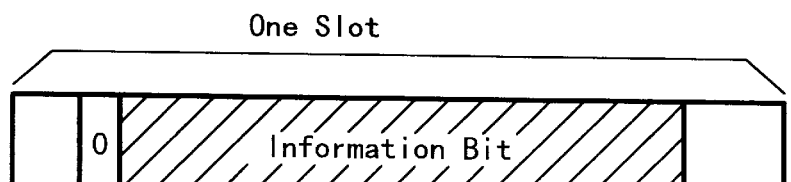
FIGS. 3A and 3B are explanatory diagrams each showing a slot configuration according to an embodiment of the present invention.

As shown in FIG. 3A, a signal transmitted in each slot period includes a predetermined number of information bits provided in a predetermined section. The audio data, facsimile data, electronic mail data and the like as described above are transmitted using these information bits. In this case, at least one bit of header information is added immediately before the section for the information bit. Further, synchronization bits, various control bits and the like are added to other sections. Normally, "0" data is transmitted by the one bit of header information.

Figure 3B:
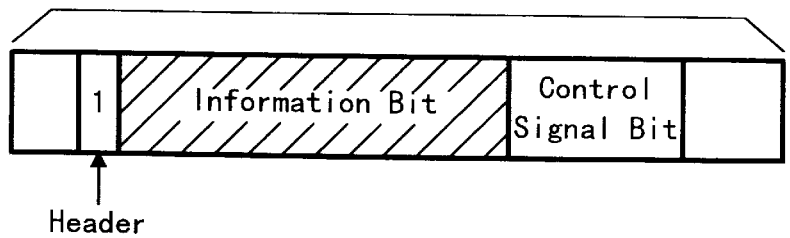

When this one bit of header information is "1" data, as shown in FIG. 3B, a part of the section of the information bits (e.g., a section in which several bits can be transmitted) is used as a section for transmitting control signal bits. As data transmitted in the control signal bits, data regarding the setting of a new transmission channel and the like are transmitted. Specifically, a setting request signal for setting another transmission channel which is different from the current transmission channel used for communication and line disconnection data for terminating the communication through the transmission channel thus set and the like are transmitted.

When the control unit of the receiving side (the control unit 22 of the terminal apparatus and the control unit 55 of the base station) detects that the header information is "1", the control unit shortens the section in the slot containing the information bits as indicated by the detected head information, discriminates the data in the section of the control signal bits as a control signal and performs the corresponding control.

A description will now be made of an example of communication carried out between a base station and a terminal apparatus in this configuration for communication. For example, when data requesting an outgoing call is transmitted from a specified terminal apparatus to a base station using an up link control channel, the control unit 55 of the base station transmits a corresponding response signal to the terminal apparatus through a down link control channel if it determines that it can respond to the request for an outgoing call. The response signal at this time specifies the transmission channel through which the communication is to take place (specifies the transmission frequency and the slot number to be used for transmission and so on). For example, when it is specified to use the slots No. T1 and R1 at a particular transmission frequency, as shown in FIG. 5A, bi-directional communication using the slots No. T1 and R1 is carried out.

In this case, for example, audio data is transmitted in the section of information bits in each slot period, and an audio call is made between the terminal apparatus and the party connected by way of the base station on a bi-directional basis. As shown in FIG. 3A, the header information in the data in each slot period used at this time is "0" data and therefore a long section for information bits is set for the slot.

When the terminal apparatus needs to initiate transmission of image data for facsimile during the audio transmission, it activates the facsimile processing unit 24 under the control of the control unit 22 of the terminal apparatus, changes the header information in the slot transmitted to the base station to "1" data to set a section for control signal bit, and transmits data requesting an outgoing call using the signal bit.

When the base station receives the data for an outgoing call, the control unit 55 of the base station determines whether or not there is any empty slot (a slot which is not in use for communication with another terminal apparatus) at the same transmission frequency. If there is an empty slot the control unit 55 allocates the empty slot to this terminal apparatus. At this allocation, the header information in the slot for transmitting audio data to the terminal apparatus is changed to "1" data to set a section for control signal bits with which response data such as slot allocation information or the like is transmitted.

When the terminal apparatus receives this response data, it begins to use also the corresponding slot for transmission and reception and initiates transmission of the image data for facsimile using the newly allocated slot. For example, when the slots No. T2 and R2 are newly allocated in a state wherein bi-directional communication of audio data is being carried out by using the slots No. T1 and R1 (FIG. 5A), as shown in FIG. 5B, transmission from the base station to the terminal apparatus using the slots No. T1, T2 and transmission from the terminal apparatus to the base station using the slots No. R1, R2 are performed, and the image data for facsimile is transmitted to the party through bi-directional communication by using the newly allocated slots No. T2, R2.

When the transmission of the image data for facsimile is desired to be terminated, data for terminating the communication using the slots No. T2, R2 is transmitted from the terminal apparatus to the base station in the section for control signal bits in the slot R1 or R2 to terminate the communication using the slots No. T2, R2. In this state, the communication using only the slots No. T1, R1 is resumed to continue the call by transmitting audio data. To terminate the transmission of audio data, line disconnection data for the corresponding slots are again transmitted to terminate the communication. The line for the communication in the slot periods T1, R1 for transmitting audio data may be disconnected before the communication using the slots No. T2, R2 is terminated.

Such a mode of communication allows communication through one logical transmission channel using the slots No. T2, R2 to be initiated while audio data is being transmitted by communication through another logical transmission channel using the slots No. T1, R1. Thus, a plurality of transmission channels are simultaneously set, and the image data for facsimile can be transmitted without interrupting the audio transmission.

Although successive slot periods are used here, discrete slot periods may be used. Further, when a terminal apparatus has a capability of processing communication at two transmission frequencies (transmission channels) simultaneously, the newly allocated slots may be set to slots at a different transmission frequency. Furthermore, although simultaneous transmission of image data for facsimile in addition to audio data has been described here, data for electronic mail may be transmitted instead of image data for facsimile.

Further, although facsimile image data or electronic mail data is transmitted through bi-directional communication by providing additional slots for bi-directional transmission in the above-described embodiment, only additional slots may be provided in the direction of transmitting such data (slots transmitted from the terminal apparatus to the base station in the above-described embodiment). In this case, if it is required to have some response data returned from the party, a section for transmitting control signal bits may be set in slots for transmitting audio data and the response data may be returned using the control signal bits.

Further, when the transmission of facsimile image data or electronic mail data requires a transmission capacity larger than that for transmission of audio data, the number of the slots added may be increased. For example, when the transmission of facsimile image data or electronic mail data which requires a large transmission capacity is initiated while audio data are being transmitted through communication using the slots No. T1, R1 as shown in FIG. 5A, the slots No. T2, T3, R2, R3 may be added as shown in FIG. 5C, and the facsimile image data or electronic mail data may be transmitted using the sections for information bits of each of the two transmission and reception slots thus added. This makes it possible to accommodate data requiring a large transmission capacity.

Further, while audio data is being transmitted through communication using the slots No. T1, R1 as shown in FIG. 5A, the transmission of facsimile image data through communication using the slots No. T2, R2 may be initiated as shown in FIG. 5B and, thereafter, the transmission of electronic mail data through communication using the slots No. T3, R3 may be further initiated as shown in FIG. 5C.

Although the description so far has referred to the transmission of a plurality of types of data from a terminal apparatus, data of a type other than audio data (facsimile image data, electronic mail data or the like) may be transmitted from the side of the base station (i.e., the party connected by way of the base station) to the terminal apparatus using additional slots while transmission of audio data or the like is in progress between the base station and the terminal apparatus. Referring to processes at the terminal apparatus in this case, the audio processing unit 17 may be operated in addition to the circuits for communication processing such as transmission, reception, modulation and demodulation or the like during transmission or reception of audio data to perform a call process; the facsimile processing unit 24 may be activated when the transmission of facsimile image data is started to start processing of the facsimile image data to be transmitted; and the electronic mail portion 25 may be activated when the transmission of electronic mail data is started to initiate the process of electronic mail data to thereby perform the respective processes.

Further, it is also possible that a plurality of transmission slots and reception slots may be allocated in advance when communication is started between a base station and a terminal apparatus, and a number of slots among the allocated slots may be used in a quantity depending on the capacity of data transmitted. In this case, even if a capacity of data to be transmitted is changed and then reduced as compared with that at an initial state, then a slot allocated to the terminal apparatus may still be allocated to the terminal apparatus. In this processing, while the slot is not allocated to other terminal apparatus, it may not be problematic when sufficient slots are provided.

Although an example of the application of the present invention for the TDMA method has been described above, the process according to the present invention is obviously applicable to other systems of communication. As another example, a description will now be made for an application to a system wherein a multi-carrier signal is transmitted.

The transmission of a multi-carrier signal is a system wherein a plurality of subcarriers are arranged at a predetermined frequency interval in one transmission band for communication between a base station and a terminal apparatus and wherein information is distributed to each subcarrier and modulated to transmit the data. For example, as a modulation process at a base station or a terminal apparatus (corresponding to the modulation process at the modulator 20 in the case of the terminal apparatus, and to the modulation process included in each of the communication units 54a through 54n in the case of the base station), a process having the configuration shown in FIG. 6 is performed.

Specifically, reception data which is a symbol string is supplied to a convolutional encoding circuit 61 to obtain convolution-encoded data; the data which has been convolutional encoded is supplied to an interleave buffer 62 to be subjected to an interleave process wherein the data are rearranged by a predetermined length; the interleaved data is subjected to DQPSK modulation by a DQPSK modulation circuit 63 to provide a transmission signal; and the modulated transmission signal is supplied to an inverse fast Fourier transformation circuit (IFFT circuit) 64 to be subjected to an inverse fast Fourier transformation process wherein data arranged on a frequency base is converted into multi-carrier signals arranged on a time base.

The multi-carrier signals output from the IFFT circuit 65 are supplied to a windowing circuit 64 for multiplying it by windowing data for each signal of a predetermined unit length, and the signals multiplied by the windowing data are converted into an analog signal by a digital-to-analog converter 66 to be supplied to the transmission unit 21 (see FIG. 1) where they are subjected to frequency conversion and transmitted in a predetermined frequency band.

Next, a process having the configuration shown in FIG. 7 is carried out as a demodulation process at a terminal apparatus or a base station which receives the multi-carrier signals transmitted after being processed as described above (a demodulation process which corresponds to the demodulation process at the demodulation unit 15 in the case of the terminal apparatus and which is included in each of the communication units 54a through 54n in the case of the base station).

Specifically, the signals which have been received and then converted into an intermediate frequency signal are supplied to an analog/digital converter 71 to be sampled at a predetermined sampling frequency; the sampled data is supplied to a reverse windowing circuit 72 to be multiplied by reverse windowing data for each signal in a predetermined unit length (this inverse framing data is data which is the reverse of the framing data for transmission) to restore the original data; and the restored data is supplied to a fast Fourier transformation circuit (FFT circuit) 73 wherein a fast Fourier transformation process is performed to make the time-series multi-carrier signals as data of respective subcarriers. The converted signals are supplied to a DQPSK demodulation circuit 74 to be demodulated, and the demodulated signals are supplied to a deinterleave buffer 75 where they are subjected to a deinterleave process to be returned to the original arrangement. The deinterleaved data in the original arrangement is supplied to a Viterbi decoding circuit 76 to decode the data which has been subjected to convolutional encoding to obtain reception data which is symbol strings.

The encoding and the decoding in the above description are not limited to convolutional encoding and the Viterbi decoding, but encoding for providing large intervals between the strings of transmitted symbols and decoding for estimating the string of the highest likelihood based on the received symbols may be prepared. That is, the known turbo code or the like may be used.

Figure 8A:
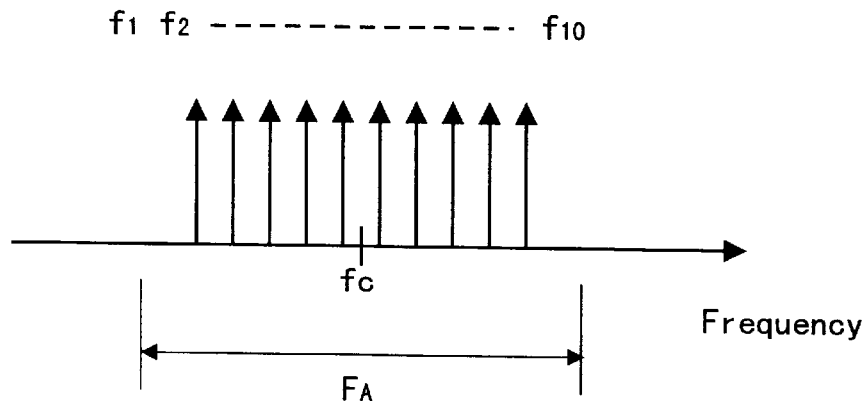
FIGS. 8A and 8B are explanatory diagrams showing states of transmission of a multi-carrier signal in the examples shown in FIGS. 6 and 7.
Figure 8B:
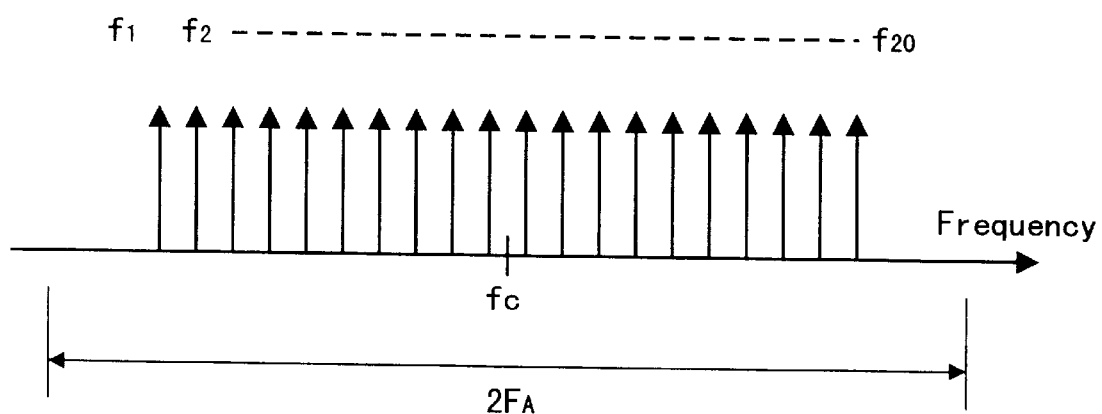

A description will now be made with reference to FIGS. 8A and 8B on a process of simultaneously transmitting a plurality of types of data during the transmission of multi-carrier signals processed as described above. As shown in FIG. 8A, in the present embodiment, one transmission band $F_A$ is set in a predetermined frequency band (e.g., a width of 150 kHz), and ten subcarrier signals $f_1, f_2, \ldots, f_{10}$ are provided at a predetermined frequency interval (e.g., at an interval of 6.25 kHz) in a band $F_B$ in the middle thereof to transmit data which had been modulated into respective subcarrier signals. For example, an audio call is carried out by transmitting audio data which has been modulated into the ten subcarrier signals $f_1$ through $f_{10}$ between a party connected by way of a base station and a terminal apparatus on a bidirectional basis. The band other than the subcarrier transmission band $F_B$ in one transmission band $F_A$, i.e., a band $F_0$ is set as a guard band.

When another type of data (e.g., facsimile image data or electronic mail data) is desired to be transmitted simultaneously with the audio data, the number of the subcarrier signals arranged in one transmission band $F_A$ is increased. Specifically, as shown in FIG. 8B, five subcarrier signals $f_{11}$ through $f_{15}$ and $f_{16}$ through $f_{20}$ are respectively provided in the adjacent bands higher and lower than the ten subcarrier signals $f_1$ through $f_{10}$ and thus a multi-carrier signal consisting of 20 subcarriers in total is transmitted. The data of a type other than audio data (facsimile image data or the like) is transmitted by the ten subcarrier signals $f_{11}$ through $f_{20}$ thus added. A guard band $F_0'$ which is a band other than a subcarrier transmission band $F_C$ in one transmission band $F_A$ is narrower than that in the case of transmission of only ten subcarriers.

In such a transmission process, by increasing the number of subcarriers set in one transmission band, a plurality of types of data such as audio data and facsimile image data can be simultaneously transmitted. Specifically, data transmission is performed through one transmission channel constituted by the ten subcarrier signals $f_{11}$ through $f_{20}$ in addition to the data transmission through one transmission channel constituted by the ten subcarrier signals $f_1$ through $f_{10}$, and thus a plurality of logical transmission channels are simultaneously set. In this case, in the case of the example shown in FIG. 8B, twenty subcarriers can be set in advance in one transmission band, but only ten subcarriers are set to transmit one type of data. Then, when the types of data transmitted is to be increased, only the number of subcarriers is increased without changing the width of one transmission band. As a result, when a transmission channel is set at the beginning of communication with the terminal apparatus under control of a base station, it is always required only to set a channel having the same band width, which simplifies the communication control process. Further, communication is always carried out preferably because a change in the number of the subcarriers only results in a change in the band width of the guard band $F_0$ ($F_0'$). That is, it is important to increase a guard band width in order to maintain preferable transmission conditions and, therefore, setting the guard band $F_0$ having a large band width as shown in FIG. 8A is not useless. Further, even when twenty subcarriers are set as shown in FIG. 8B, the guard band $F_0'$ having a minimum required band width is provided to maintain a certain degree of transmission conditions.

Although a process wherein the number of subcarriers is increased or decreased without changing the width of one transmission band has been described here, the number of transmission bands set for simultaneous use may be changed depending on the number of the types of data to be simultaneously transmitted with the number of subcarriers in one transmission band fixed.

Further, even in transmission using this multi-carrier signal, data for controlling the start and termination of simultaneous transmission of a plurality of types of data and the like can be accommodated by using and transmitting a predetermined part of information bits distributed to and transmitted by the subcarriers as signal bits for control data such as outgoing call data or the like.

Although the terminal apparatus described above is basically capable of processing a plurality of types of data therein whether it uses the TDMA system or multi-carrier system, a terminal apparatus may have a configuration wherein the terminal apparatus itself is capable of only separating a plurality of type of data it has received and synthesizing and transmitting a plurality of types of data and wherein the reception data thus separated and the transmission data to be synthesized are input and output from an external apparatus connected to the terminal apparatus.

Figure 10:
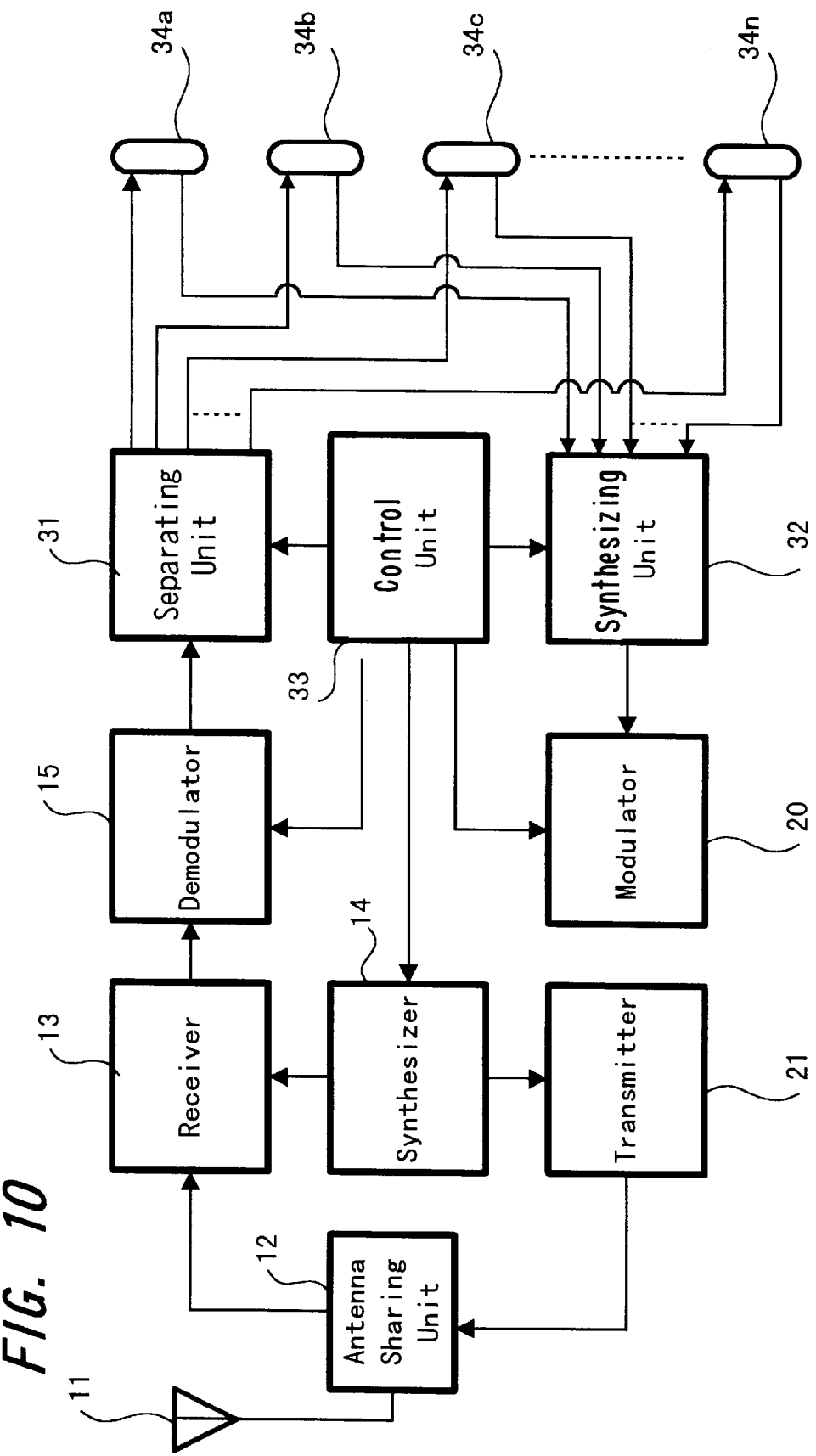
FIG. 10 is a block diagram showing a configuration of a terminal apparatus according to another embodiment of the present invention.

FIG. 10 illustrates an example of a configuration of a terminal apparatus in such a case. Parts corresponding to those in the terminal apparatus shown in FIG. 1 are given like reference numbers and will not be described here in detail. Referring to the configuration, reception data which has been received at a reception unit 13 and demodulated by a demodulation unit 15 is supplied to a separation portion 31 to be separated into each type of the reception data. Respective types thus separated are supplied to separate terminal portions 34a, 34b, . . . , 34n (n is an arbitrary number) to be supplied to respective different data processing apparatuses (not shown) connected to the terminal portions 34a through 34n. Transmission data supplied to the respective terminal portions 34a, 34b, . . . , 34n from an external data processing apparatus are supplied to a synthesizing unit 32 to be synthesized and are transmitted by a transmission unit 21 after being modulated by a modulation unit 20.

The separation process at the separation portion 31 and the synthesizing process at the synthesizing unit 32 are executed under control of a control unit 33 which is a system control of this terminal apparatus. For example, in the case of a terminal apparatus which communicates according to the TDMA system, the separation portion 31 of the terminal apparatus separates a reception signal at each slot in-one frame and supplies the results to the separate terminal portions 34a, 34b, . . . to thereby supply separate data processing apparatuses connected to the terminal portions 34a, 34b, . . . with the corresponding types of reception data. Different types of data supplied from the data processing apparatuses connected to the terminal portions 34a, 34b, . . . are each synthesized by the synthesizing unit 32 as data in different slots and are transmitted using different slots in one frame.

Further, in the case of a terminal apparatus that communicates according to the multi-carrier system, the separation portion 31 of the terminal apparatus separates data which has been converted by a symbol string as a result of demodulation into data which has been transmitted by modulating into a first group of subcarriers (e.g., $f_1$ through $f_{10}$ in FIG. 8B) and data which has been transmitted by modulating into a second group of subcarriers (e.g., $f_{11}$ through $f_{20}$ in FIG. 8B) and supplies them to the terminal portions 34a and 34b, respectively, to thereby supply them to data processing apparatuses (not shown) connected to the terminal portions 34a and 34b, respectively. Different types of data supplied from the data processing apparatuses connected to the terminal portions 34a, 34b, . . . are each synthesized by the synthesizing unit 32 into data strings to be modulated into different groups of subcarriers and are supplied to the modulation unit 20. Each type of data is subjected to a process of modulation into subcarrier signals at the modulation unit 20 to be modulated into different groups of subcarriers and is transmitted.

The separation process on received data and the synthesizing process on data to be transmitted as described above allow simultaneous transmission of a plurality of data of different types between a plurality of data processing apparatuses connected to this terminal apparatus and a party connected by way of a base station. For example, a plurality of series of data such as facsimile image data and electronic mail data can be simultaneously transmitted. Needless to say, a plurality of series of data of the same type can be simultaneously transmitted.

Figure 9A:
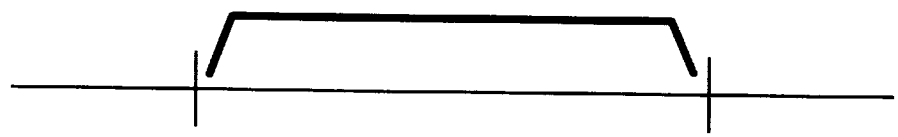
FIGS. 9A and 9B are diagrams used to explain how to set a plurality of logical transmission channels simultaneously.
Figure 9B:
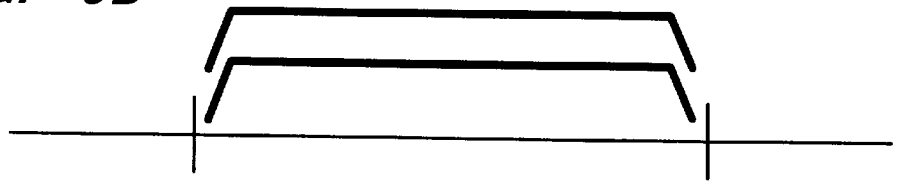

Although each of the above embodiments has referred to a process of simultaneously transmitting three types of data, i.e., audio data, facsimile image data and electronic mail data in combination, combinations of other types of data are obviously possible. Further, the invention can be applied to a process of setting a plurality of logical transmission channels simultaneously for communication using methods of transmission other than the TDMA system and multi-carrier system. For example, the present invention is compatible with the CDMA system if transmission is performed by dispersing plural series of signals to different spread symbols and setting a plurality of logical transmission channels simultaneously. FIGS. 9A and 9B shows how to set a plurality of logical transmission channels simultaneously.

According to the present invention, while a terminal apparatus and a base station are in communication for transmitting a predetermined information using a predetermined transmission channel, a signal requesting to set another transmission channel is transmitted using a part of the predetermined transmission channel to initiate communication between the terminal apparatus and the base station through the other transmission channel. This makes it possible to set another transmission during a communication that is in progress and, for example, to transmit data of a type different from the data currently communicated by using the other transmission channel thus set.

In this case, when the communication between the terminal apparatus and the base station is initiated, a channel having a capacity which allows a plurality of transmission channels to be set is allocated in advance; a predetermined information is transmitted through a predetermined channel among the plurality of allocated transmission channels; and the remaining transmission channels among the plurality of allocated channels are used as different transmission channels when a request signal to set another transmission channel is transmitted. This eliminates the need for looking for an empty channel when the other transmission channel is to be allocated and thus allows channel allocation to be carried out through a simple process.

Further, since the capacity for the transmission between the terminal apparatus and base station is increased each time another transmission channel is set as a result of the transmission of the signal requesting to set the other transmission channel in the above-described case, the transmission capacity can be appropriately set depending on the data transmitted at that time.

Furthermore, since the type of the information transmitted through the predetermined channel and the type of the information transmitted through the other channel are made different in the above-described case, it is possible to transmit a plurality of types of data simultaneously to allow efficient communication.

In addition, when the present invention is applied to a terminal apparatus, plural series of information input thereto are transmitted to a base station after being synthesized and information transmitted from the base station is output after being separated into each series. This allows simultaneous communication between a plurality of information processing apparatuses connected to the terminal apparatus and a party connected by way of the base station and allows simultaneous transmission from a plurality of information processing apparatuses using a single terminal apparatus.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication resource allocation method for allocating a communication resource in a second apparatus in response to a request from a first apparatus, the method comprising the steps of:

receiving a signal generated by said first apparatus and transmitted to said second apparatus, wherein in a normal state of audio data transmission said signal has a predetermined number of information bits and in an allocation request state said signal has at least one of said predetermined number of information bits assigned as an allocation request bit, determining that said received signal is an audio data signal in said normal state of audio data transmission, allocating a communication resource upon determining said audio data signal is being received, receiving a non-audio data signal while receiving said audio data signal, determining that said received non-audio data signal includes said allocation request bit, and reallocating the communication resource to accommodate the non-audio data signal while receiving said audio data signal upon determining a presence of said allocation request bit in said received non-audio data signal.

2. A communication resource allocation method according to claim 1, further comprising the step of transmitting header information indicating an existence of said allocation request bit from said first apparatus to said second apparatus in addition to said predetermined number of information bits.

3. A communication resource allocation method according to claim 1, wherein communication resources which have capacity for communicating a plurality of informations are allocated first in said step of allocating said communication resource by said second apparatus, and communication resources which are not allocated at the time are allocated at a next time by said second apparatus.

4. A communication resource allocation method according to claim 1, wherein communication resources which have a predetermined capacity are allocated in said step of allocating said communication resource every time an allocation request is received by said second apparatus in said step of receiving.

5. A communication resource allocation method according to claim 1, wherein said communication is executed in a TDMA format, and said communication resource allocation is executed by an allocation of at least one time slot.

6. A communication resource allocation method according to claim 1, wherein said communication is executed in a multi-carrier format, and said communication resource allocation is executed by an allocation of at least one sub-carrier.

7. A communication resource allocation method according to claim 1, wherein said communication is executed in a CDMA format, and said communication resource allocation is executed by using a spread spectrum code.

8. A base station for allocating a communication resource, comprising:

receiving means for receiving a signal consisting of audio data and a plurality of information bits from a subscriber;

control means for allocating a communication resource for the audio data and for picking up at least one of said plurality of information bits as an allocation request bit while said signal consisting of audio data is being received, said allocation request bit indicating non-audio data, and for reallocating the communication resource to accommodate the non-audio data while receiving the audio data when said allocation request bit is detected; and transmitting means for transmitting the communication resource allocation result for the audio data and the non-audio data to said subscriber, wherein said receiving means and said transmitting means communicate in a CDMA format, and said communication resource allocation is executed by at least one spread spectrum code.

9. A base station according to claim 8, wherein said control means detects an existence of said allocation request bit by detecting header information in said output signal of said receiving means.

10. A base station according to claim 8, wherein communication resources which have a capacity for communicating a plurality of informations are allocated first when allocating said communication resource by said control means, and communication resources which are not allocated at the time are allocated at a next time by said control means.

11. A base station according to claim 8, wherein communication resources which have a predetermined capacity are allocated every time when an allocation request arrives in a case of allocating said communication resource by said control means.

12. A base station according to claim 8, wherein said receiving means and said transmitting means communicate with each other in a TDMA format, and said communication resource allocation is executed by an allocation of at least one time slot.

13. A base station according to claim 8, wherein said receiving means and said transmitting means communicate with each other in a multi-carrier format, and said communication resource allocation is executed by an allocation of at least one sub-carrier.

14. A subscriber apparatus comprising:

control means for generating a communication resource allocation signal for use by a base station;

first signal generating means for generating a first signal composed of audio data;

transmitting means for transmitting an output signal from said control means to said base station, wherein in a normal state said transmitting means transmits the signal composed of audio data and having a predetermined number of information bits; and second signal generating means for generating a second signal composed of non-audio data while said first signal generating means is generating said first signal, wherein when said second signal is generated said control means generates a signal in which at least one of said predetermined number of information bits is an allocation request bit for transmission to said base station by said transmitting means, and wherein said transmitting means transmits the second signal composed of non-audio data while transmitting the signal composed of audio data.

15. A subscriber apparatus according to claim 14, wherein said control means generates a header signal which indicates an existence of said allocation request bit, in a case of generating said allocation request bit.

16. A subscriber apparatus according to claim 14, wherein said transmitting means transmits a TDMA format signal.

17. A subscriber apparatus according to claim 14, wherein said transmitting means transmits a multi-carrier format signal.

18. A subscriber apparatus according to claim 14, wherein said transmitting means transmits a CDMA format signal.

* * * * *